(12) United States Patent
Hara

(10) Patent No.: US 7,661,198 B2
(45) Date of Patent: Feb. 16, 2010

(54) TOE ANGLE MEASURING INSTRUMENT AND TOE ANGLE MEASURING METHOD

(75) Inventor: Kiyonobu Hara, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 11/813,639

(22) PCT Filed: Jan. 10, 2006

(86) PCT No.: PCT/JP2006/300152

§ 371 (c)(1),
(2), (4) Date: Jul. 10, 2007

(87) PCT Pub. No.: WO2006/075579

PCT Pub. Date: Jul. 20, 2006

(65) Prior Publication Data

US 2009/0000133 A1    Jan. 1, 2009

(30) Foreign Application Priority Data

Jan. 11, 2005    (JP)    ............... 2005-003445

(51) Int. Cl.
*G01B 5/24* (2006.01)
(52) U.S. Cl. .............. 33/203.15; 33/203.18; 33/288
(58) Field of Classification Search .............. 33/203.15, 33/203.12, 203.18, 203, 286, 288, 293, 600; 382/103–104, 151, 291; 356/139.09, 620
See application file for complete search history.

(56) References Cited

U.S. PATENT DOCUMENTS

| 4,337,581 | A | * | 7/1982 | Eck | 33/288 |
| 4,457,075 | A | | 7/1984 | Murata | |
| 4,569,140 | A | * | 2/1986 | Hobson | 33/203.18 |
| 4,967,480 | A | * | 11/1990 | DeLuca | 33/288 |
| 5,033,198 | A | * | 7/1991 | Hastings | 33/203.18 |
| 5,218,556 | A | * | 6/1993 | Dale, Jr. | 700/279 |
| 5,842,281 | A | * | 12/1998 | Mieling | 33/203.18 |
| 6,799,376 | B1 | * | 10/2004 | Hillman et al. | 33/203.18 |

FOREIGN PATENT DOCUMENTS

| DE | 38 30 229 | 3/1990 |
| EP | 1 512 941 | 3/2005 |

(Continued)

*Primary Examiner*—G. Bradley Bennett
*Assistant Examiner*—Tania C Courson
(74) *Attorney, Agent, or Firm*—Rankin, Hill & Clark LLP

(57) ABSTRACT

A toe angle measuring instrument comprising a measurement unit having a seating table seating a hub of a vehicle on a seating stand and movable in the lateral direction of the vehicle and in a rotating direction in plan view relative to a second base member. The toe angle measuring instrument further comprising a measured member having a vertical measurement surface extending from the seating table to the outside and non-contact distance sensors installed oppositely to the measurement surface with reference to the second base member and measuring distances (x1) and (x2) up to the measurement surface from two positions apart a distance (y1) from each other. The measurement surface is set to face in a direction forming an acute angle relative to a lateral direction of the vehicle.

16 Claims, 15 Drawing Sheets

FOREIGN PATENT DOCUMENTS

| | | |
|---|---|---|
| GB | 2 179 165 | 2/1987 |
| JP | 57-100307 | 6/1982 |
| JP | 63-163101 | 7/1988 |
| JP | 01-134201 | 5/1989 |
| JP | 06-109462 | 4/1994 |
| JP | 2004-009801 | 1/2004 |
| JP | 2004-012195 | 1/2004 |
| WO | 92/20997 | 11/1992 |
| WO | 03/102503 | 12/2003 |

* cited by examiner

TOE ANGLE MEASURING INSTRUMENT AND TOE ANGLE MEASURING METHOD

TECHNICAL FIELD

The present invention relates to an apparatus for and a method of measuring a toe angle of a wheel of a vehicle.

BACKGROUND ART

Heretofore, there has been proposed an apparatus for measuring the toe angles of the wheels of a vehicle while reflecting a deviation in a rotational direction as viewed in plan of the vehicle that has been set in place. The apparatus has measuring units placed outwardly of the respective four, i.e., front right, front left, rear right, and rear left, wheels of the vehicle (see, for example, Japanese Laid-Open Patent Publication No. 6-109462).

Each of the measuring units of the apparatus has a measuring means including a support rod which is movable forward and rearward. The support rod has on its distal end a tiltable detection plate for contacting the outer side of a wheel. The measuring unit calculates a corrective angle β indicative of a tilt angle of the vehicle around the center of the apparatus in its entirety, from the distance that the support rod has moved forward when the detection plate contacts the wheel. Thereafter, the corrective angle β is subtracted from the tilt angle of the detection plate of each of the measuring means, thereby calculating the toe angle of each of the wheels. In this manner, a change in the toe angle due to a positional deviation of the vehicle can be compensated for.

The apparatus disclosed in Japanese Laid-Open Patent Publication No. 6-109462 determines a corrective angle θ indicative of a tilt angle of the vehicle based on the distance that the support rod has moved forward. Therefore, if the corrective angle θ is excessively large, then the support rod may not be able to move sufficiently forward, making it difficult to measure the toe angle. Even when the corrective angle θ is nil, if the vehicle is extremely displaced to the left or right, then the same difficulty tends to occur.

DISCLOSURE OF THE INVENTION

The present invention has been made in view of the above problems. It is an object of the present invention to provide an apparatus for and a method of measuring a toe angle reliably and highly accurately even if the position where the vehicle is installed is largely displaced from a standard position.

According to the present invention, a toe angle measuring apparatus includes a measuring unit for measuring a toe angle of a wheel of a vehicle. The measuring unit comprises a seating table for seating the wheel or a mount for the wheel at a fixed position. The seating table being movable in at least a transverse direction of the vehicle or a rotational direction of the seating table as viewed in plan with respect to a predetermined base member. The measuring unit further comprising a measured member having a vertical measurement surface extending outwardly from the seating table, and a pair of distance measuring means for measuring respective distances from two positions which are spaced from each other by a predetermined distance, to the measurement surface with respect to the base member. The measuring unit further comprising a toe angle calculating means for calculating the toe angle based on measured values from the distance measuring means. The measurement surface of the measured member is oriented at an acute angle with respect to the transverse direction of the vehicle as viewed in plan at least when a measurement is made.

As described above, the measurement surface of the measured member extends outwardly with respect to the wheel or the mount for the wheel, and is oriented at the acute angle with respect to the transverse direction of the vehicle as viewed in plan. Therefore, a large displacement of the wheel or the mount in the transverse direction of the vehicle is converted into a small displacement of the measurement surface in the longitudinal direction of the vehicle. Consequently, even if the installed position of the vehicle is greatly displaced from a standard position, the distances can be measured reliably and highly accurately, and the toe angle can be measured without the need for limiting the attitude of the vehicle. The toe angle is determined by measuring the distances with the distance measuring means disposed in the two positions spaced by the predetermined distance.

The acute angle may be set to a value ranging from 1° to 10°.

If the measuring unit is provided at each of four wheels of the vehicle, and the distance measuring means of the measuring units simultaneously measure the distances to the corresponding measurement surfaces, then distances can be measured efficiently.

The measuring unit may include a moving unit for moving the measured member into abutment against a side face of the wheel or a side face of the mount for the wheel. The moving unit allows the measured member to be held in a position slightly spaced from the vehicle when no measurement is made. When the measured member is held in abutment against the side face of the wheel or the side face of the mount for the wheel, the distances can be measured reliably and accurately.

According to the present invention, a toe angle measuring method of measuring a toe angle of a wheel of a vehicle comprises the first step of seating the wheel or a mount for the wheel at a fixed position on a seating table which is movable in at least a transverse direction of the vehicle or a rotational direction of the seating table as viewed in plan with respect to a base member. The second step is of urging a measured member having a vertical measurement surface extending outwardly from the seating table and oriented at an acute angle with respect to the transverse direction of the vehicle as viewed in plan at least when a measurement is made, against the wheel or the mount for the wheel. The third step is of measuring respective distances from two positions which are spaced from each other by a predetermined distance, to the measurement surface with respect to the base member. The fourth step is of calculating the toe angle based on measured values from the third step.

As the measurement surface is oriented at the acute angle with respect to the transverse direction of the vehicle as viewed in plan, a large displacement of the wheel or the mount in the transverse direction of the vehicle is converted into a small displacement of the measurement surface in the longitudinal direction of the vehicle. Consequently, even if the installed position of the vehicle is greatly displaced from a standard position, the distances can be measured reliably and highly accurately, and the toe angle can be measured without the need for limiting the attitude of the vehicle. The toe angle to be corrected is determined by measuring the distances with the distance measuring means disposed in the two positions spaced from the measurement surface by a predetermined distance. The toe angle to be corrected can be used as a basic value for calculating a toe angle.

BEST MODE FOR CARRYING OUT THE INVENTION

An apparatus for and a method of measuring a toe angle according to an embodiment of the present invention will be described below with reference to FIGS. 1 through 15 of the accompanying drawings.

Figure 1:
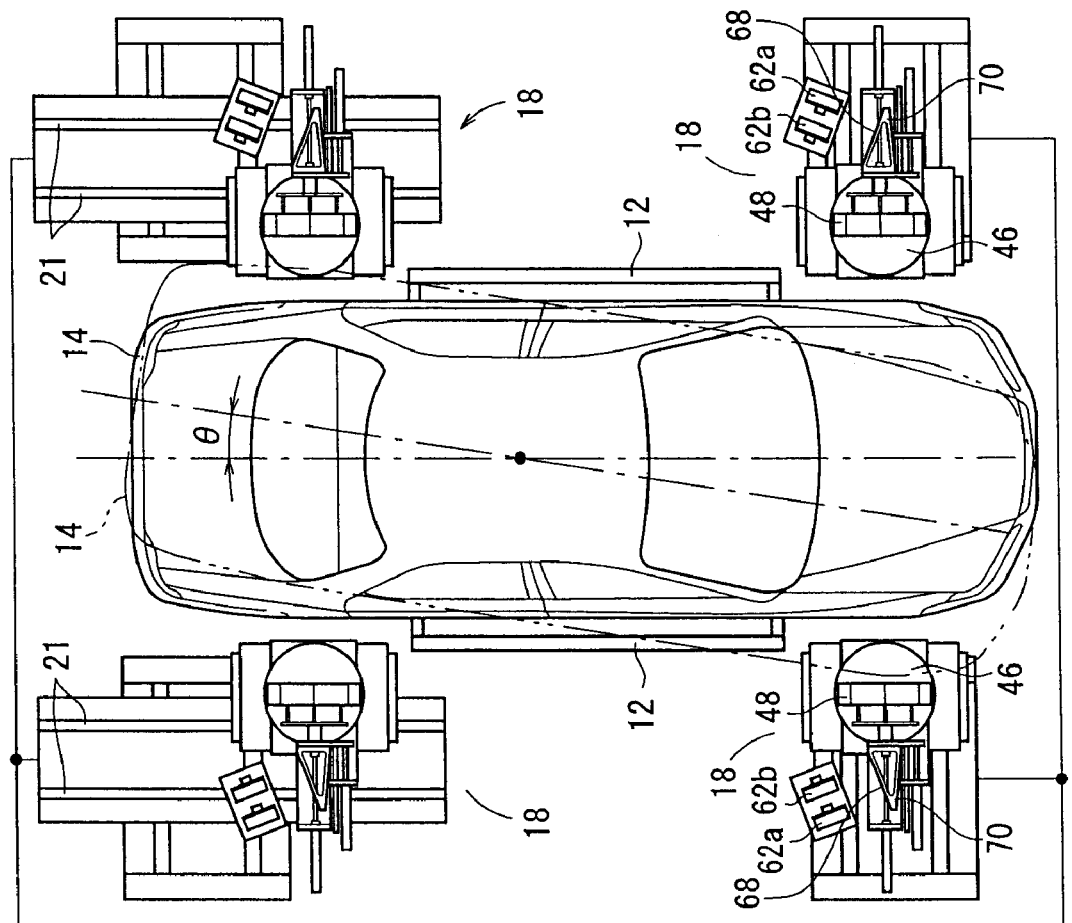
FIG. 1 is a plan view of a toe angle measuring apparatus according to an embodiment of the present invention.
Figure 2:
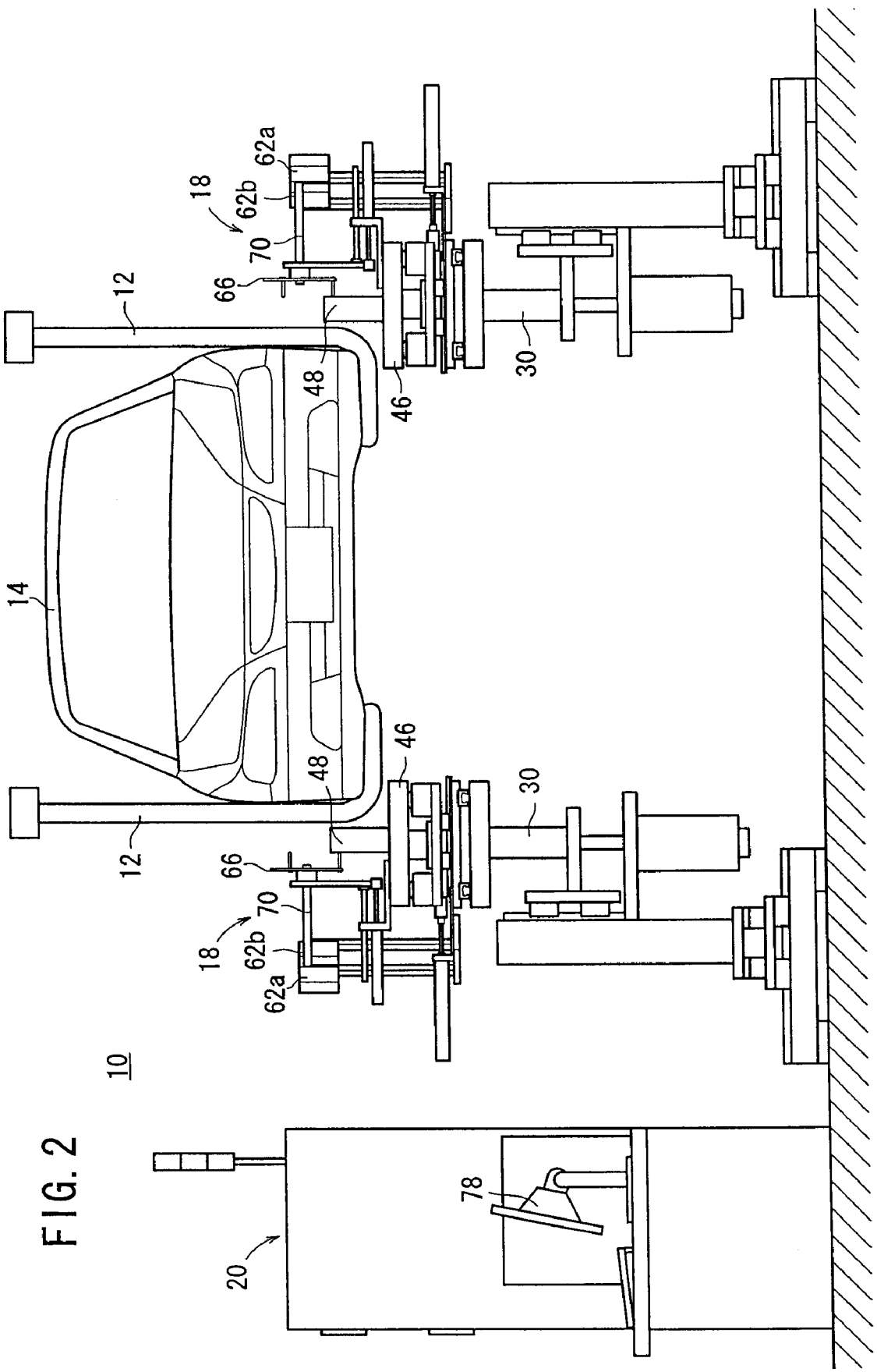
FIG. 2 is a front elevational view of the toe angle measuring apparatus according to the embodiment of the present invention.

As shown in FIGS. 1 and 2, a toe angle measuring apparatus 10 according to an embodiment of the present invention includes four measuring units 18 for measuring toe angles $\alpha_0$ to be corrected of respective hubs (wheel mounts) 16 of a four-wheel vehicle 14 that is suspended and delivered by a hanger 12, and a controller (toe angle calculating means) 20 for controlling the measuring units 18 and calculating actual toe angles $\alpha$ based on the measured results that have been obtained. Of the four measuring units 18, the two rear measuring units are disposed on rails 21 for sliding movement in the longitudinal direction of the vehicle depending on the wheelbase of the vehicle 14.

The vehicle 14 is basically fed to a position intermediate between the left and right pairs of the measuring units 18. Since the vehicle 14 is suspended by the hanger 12, the vehicle 14 may develop a corrective angle θ indicative of a deviation thereof in a thrust rotational direction as viewed in plan, or may be fed while being displaced to the left or the right.

Figure 3:
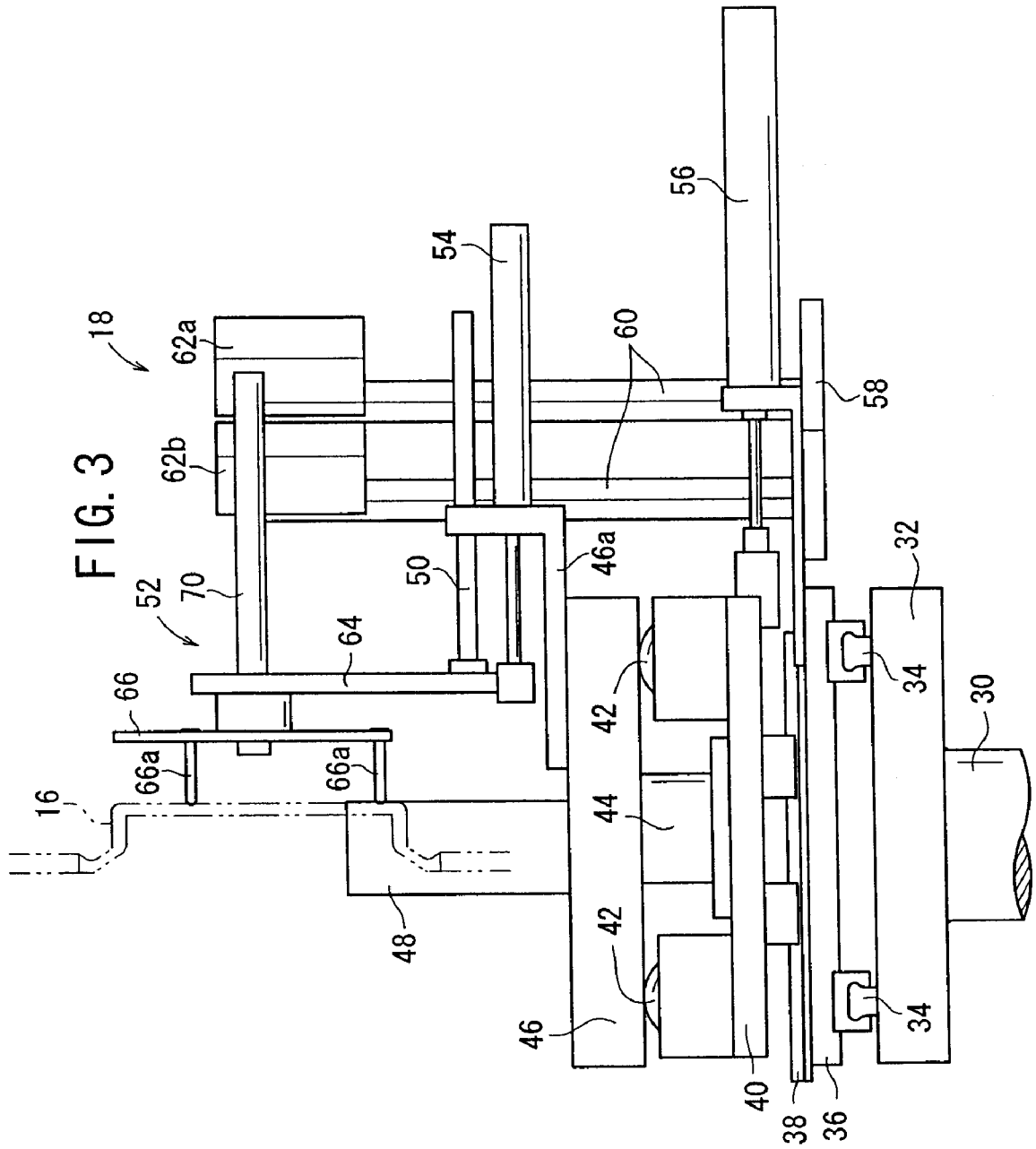
FIG. 3 is a front elevational view of a measuring unit.
Figure 4:
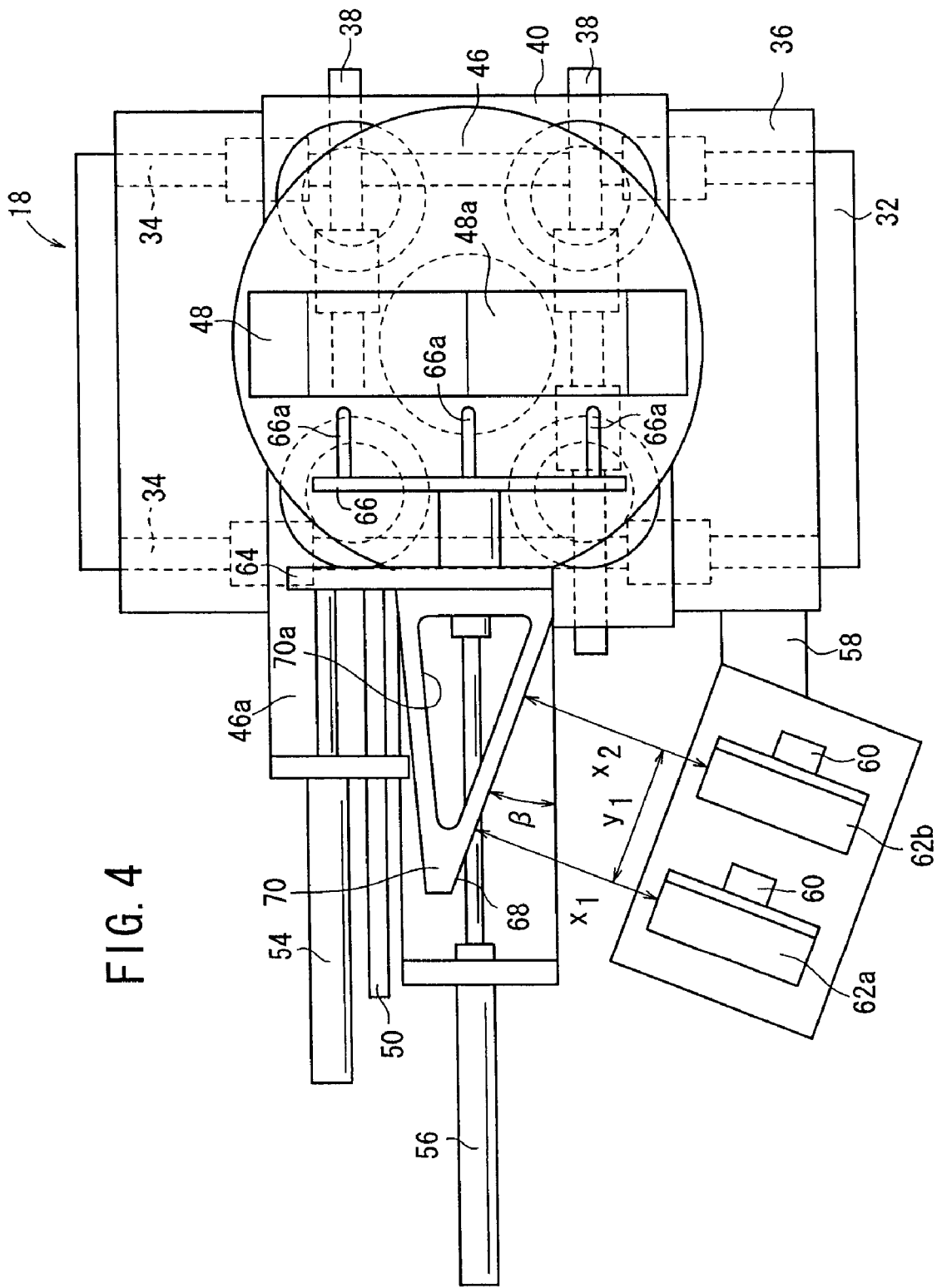
FIG. 4 is a plan view of the measuring unit.
Figure 5:
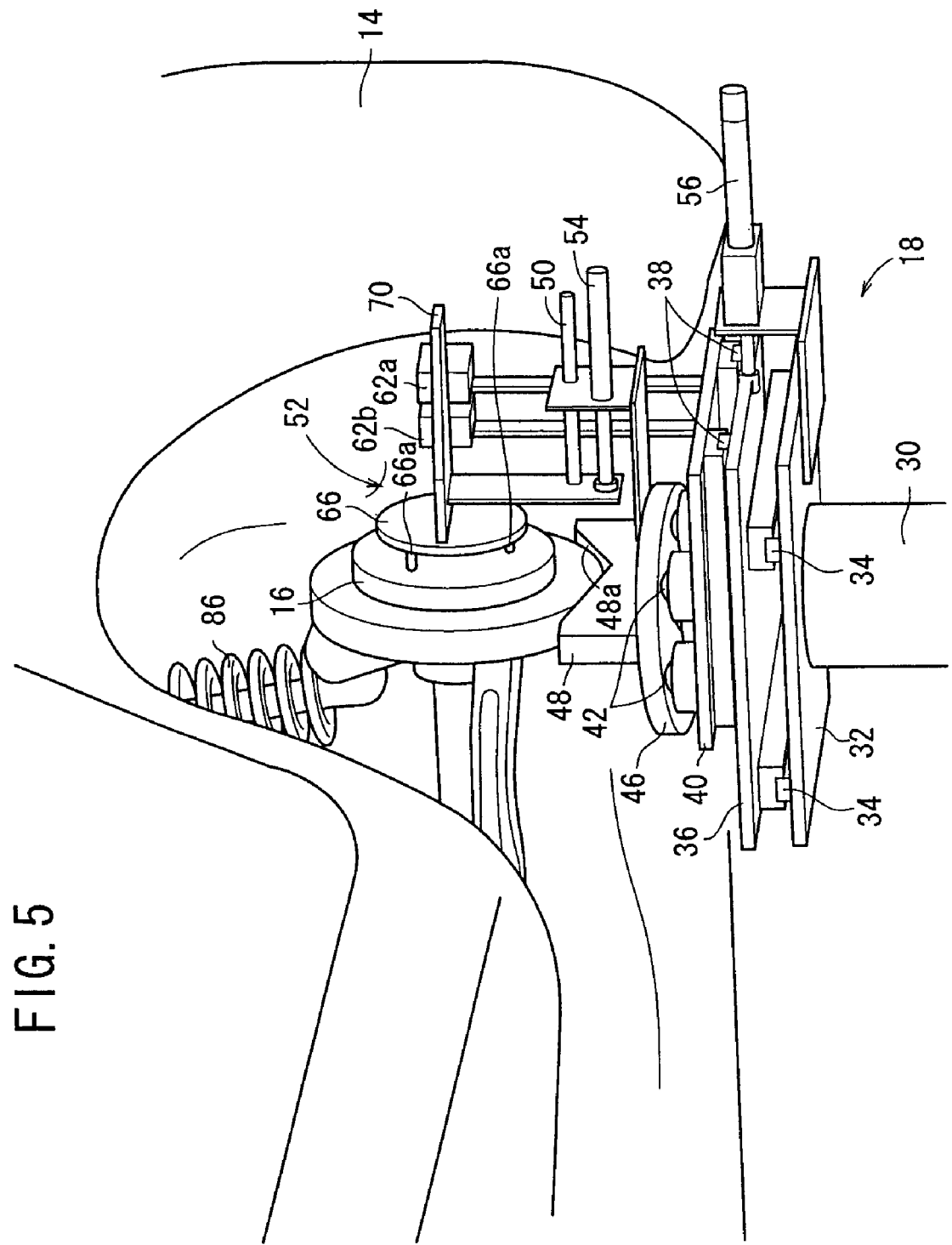
FIG. 5 is a perspective view of a measuring unit and a vehicle.

As shown in FIGS. 3 through 5, each of the measuring units 18 comprises a vertically erected main cylinder 30, a first base member 32 fixed to the distal end of the rod of the main cylinder 30, a second base member 36 supported on the first base member 32 by a pair of first rails 34 for smooth sliding movement in the longitudinal direction of the vehicle 14, a horizontal movable plate 40 supported on the second base member 36 by a pair of second rails 38 for smooth sliding movement in the transverse direction of the vehicle 14, and a seating table 46 supported by four rotatable steel balls 42 mounted on an upper surface of the horizontal movable plate 40 for smooth rotation about a central shaft 44. With the above structure, the seating table 46 is smoothly movable on a horizontal plane in the transverse direction of the vehicle 14, the longitudinal direction of the vehicle 14, and in the rotational direction, and is held in a so-called floating state. The rod of the main cylinder 30, the rod of an auxiliary cylinder 54 to be described later, and a push rod 56 can be extended and contracted by the controller 20.

The measuring unit 18 also includes a seating base 48 disposed substantially centrally on an upper surface of the seating table 46, a slider 50 mounted on the seating table 46 by a stay 46a, and a hub side face presser 52 which is guided in the transverse direction of the vehicle by the slider 50. The measuring unit 18 further includes an auxiliary cylinder 54 mounted on the stay 46a for actuating the hub side face presser 52, a push rod 56 mounted on an end of the second base member 36 for actuating the horizontal movable plate 40 in the transverse direction of the vehicle, and two laser-type noncontact distance sensors (distance measuring means) 62a, 62b mounted on two stays 60 extending upwardly from a bracket 58 which extends from the end of the second base member 36. The seating base 48 has a recess 48a (see FIG. 6) defined in an upper portion thereof and having an obtuse angle as viewed in side elevation at a fixed position where a lower surface of the hub 16 in the form of a disk is seated.

The hub side face presser 52 includes a connector 64 fixed to an end of the slider 50 and extending upwardly, a hub presser disk 66 connected to an upper portion of the connector 64 and disposed in facing relation to the hub 16, and a measured member 70 having a measurement surface 68 which extends outwardly from the connector 64.

The hub presser disk 66 has three feelers 66a angularly spaced at 120° and projecting toward the hub 16. When the hub side face presser 52 is moved by the auxiliary cylinder 54, the feelers 66a are brought into contact with the side face of the hub 16 that is seated on the seating base 48. The measured member 70 is of a triangular shape with a distal end having an acute angle as viewed in plan (see FIG. 4) and extends outwardly. The hub side face presser 52 has a hole 70a defined therein for reducing the weight thereof. The measurement surface 68 is a vertical surface facing rearward in the longitudinal direction of the vehicle, and is elongate horizontally. The measurement surface 68 is oriented at an acute angle with respect to the transverse direction of the vehicle. Specifically, a measurement surface tilt angle β which represents the angle formed between the transverse direction of the vehicle and the measurement surface 68 as viewed in plan is set to 5° when at a reference attitude. In FIGS. 1, 4, 12, and 13, the measurement surface tilt angle β is shown exaggeratedly as being about 20° for an easier understanding.

The measurement surface tilt angle β may be set to an appropriate value in view of the manner in which the vehicle 14 is delivered, etc. For example, the measurement surface tilt angle β may be selected from the range from 1° to 10° when at the reference attitude. The reference attitude mentioned above is referred to as an attitude wherein the rotational angle as viewed in plan of the seating table 46 about the central shaft 44 is 0°, and is actually set with respect to the direction in which the slider 50 moves forward and rearward. The seating table 46 is rotatable as viewed in plan, and the measurement surface 68 may have an acute angle with respect to the transverse direction of the vehicle 14 at least when measured.

The two noncontact distance sensors 62a, 62b are disposed in facing relation to the measurement surface 68 at respective positions that are horizontally spaced from each other by a certain distance $y_1$. The noncontact distance sensors 62a, 62b are arrayed such that the noncontact distance sensor 62a is positioned outwardly and the noncontact distance sensor 62b inwardly. This layout of the noncontact distance sensors 62a, 62b allows them to measure respective distances $x_1$, $x_2$ along lines normal to the measurement surface 68 from the two positions in a noncontact fashion. The measured distances $x_1$, $x_2$ are supplied to the controller 20. It is assumed that $x_1 = x_2$ when the vehicle 14 is delivered accurately to a standard position, and the corrective angle θ is 0° and the toe angle α is 0°.

The measuring unit 18 shown in FIGS. 3 through 5 is a left measuring unit for use with the left front wheel or the left rear wheel. A right measuring unit for use with the right front wheel or the right rear wheel is symmetrical in structure to the left measuring unit, and will not be described in detail below.

Figure 7:
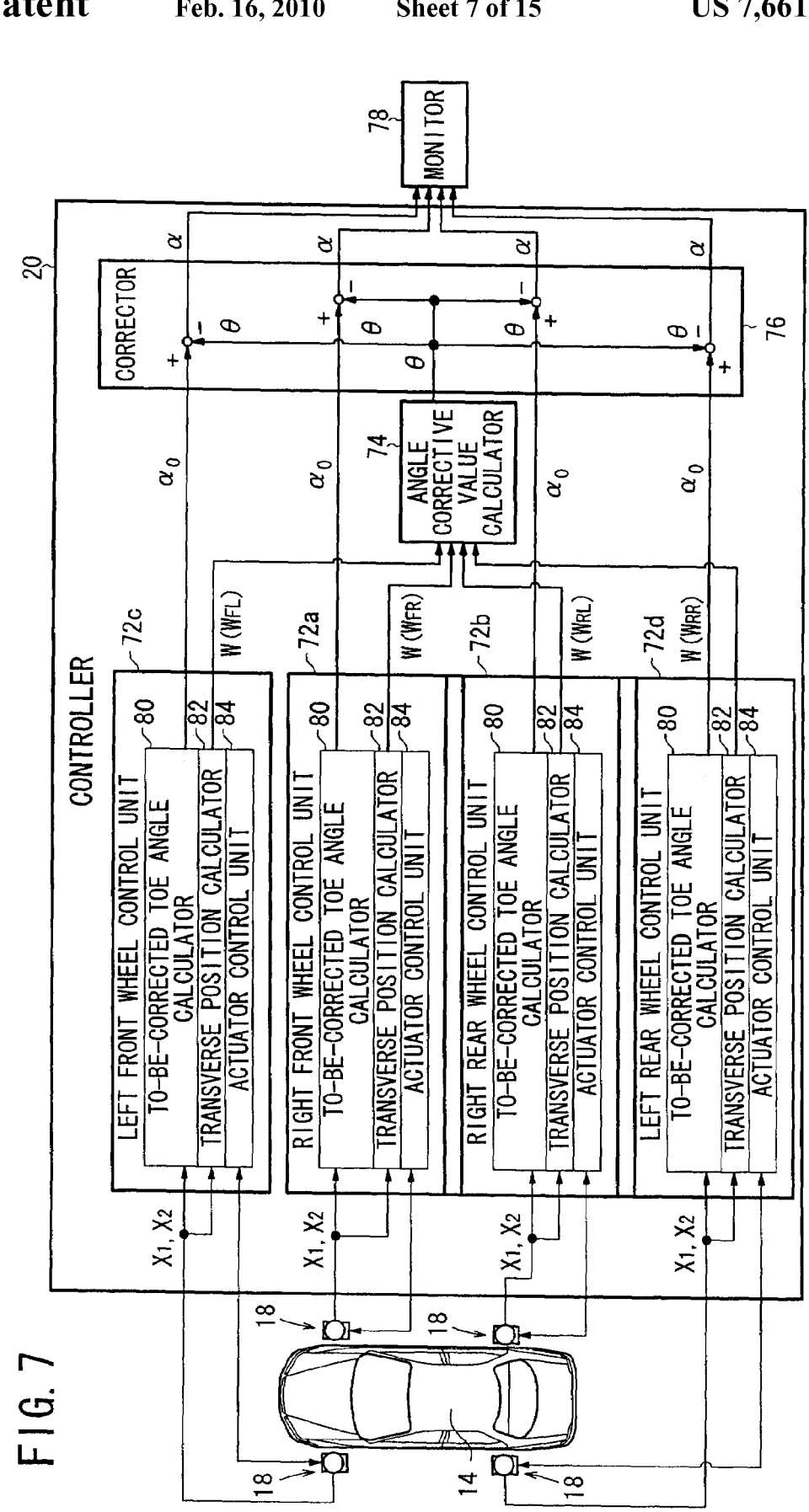
FIG. 7 is a block diagram of a controller.

As shown in FIG. 7, the controller 20 comprises a right front wheel control unit 72a, a right rear wheel control unit 72b, a left front wheel control unit 72c, and a left rear wheel control unit 72d for controlling and performs calculations on data from the respective measuring units 18 which measure the hubs 16 of the right front, right rear, left front, and left rear wheels of the vehicle 14, an angle corrective value calculator 74 for calculating a corrective angle θ, and a corrector 76 for correcting angles based on the corrective angle θ. Toe angles α calculated by the corrector 76 are displayed on the screen of a monitor 78. Each of the right front wheel control unit 72a, the right rear wheel control unit 72b, the left front wheel control unit 72c, and the left rear wheel control unit 72d includes a to-be-corrected toe angle calculator 80 for determining a toe angle $α_0$ to be corrected based on the distances $x_1$, $x_2$, a transverse position calculator 82 for determining the position W of the hub 16 in the transverse direction of the vehicle, and an actuator control unit 84 for controlling the main cylinder 30, the auxiliary cylinder 54, etc. The angle corrective value calculator 74 calculates a corrective angle θ based on the respective positions W supplied from the transverse position calculators 82. The corrector 76 determines toe angles α by subtracting the corrective angle θ from the toe angles $α_0$ to be corrected.

The controller 20 has a CPU (Central Processing Unit) as a main controller, a RAM (Random Access Memory) and a ROM (Read Only Memory) as storage units, and drivers, etc. The above functional units are realized when the CPU reads a program and performs software processing in coaction with the storage units, etc.

A method of measuring and calculating toe angles α of the hubs 16 of the vehicle 14 using the toe angle measuring apparatus 10 constructed as described above will be described below. The process shown below is performed mainly by the controller 20 through the coaction of the functional units shown in FIG. 7. The process is carried out in the order of the numbers of steps shown.

Figure 8:
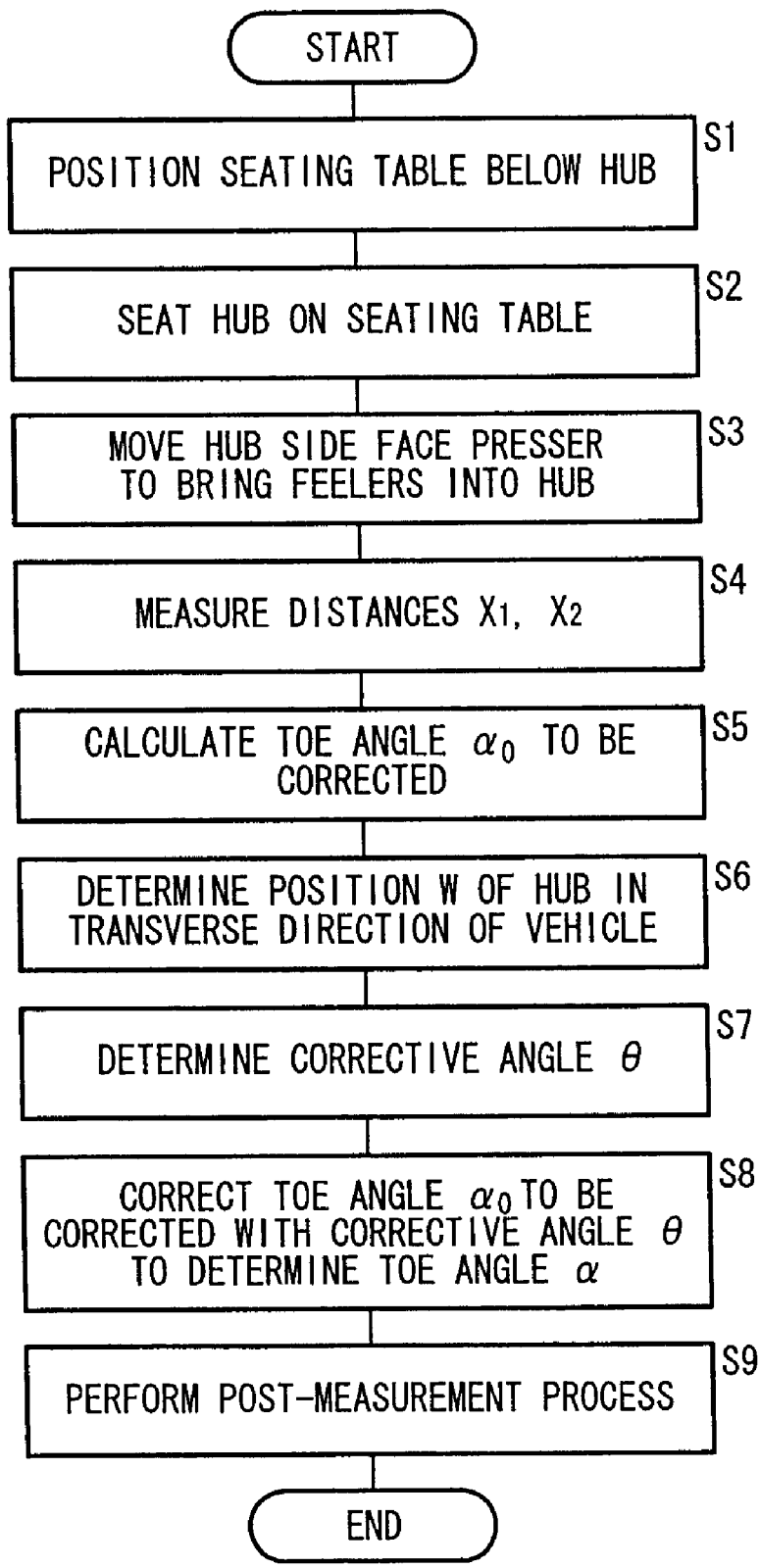
FIG. 8 is a flowchart showing a procedure of a toe angle measuring method according to the embodiment of the present invention.
Figure 9:
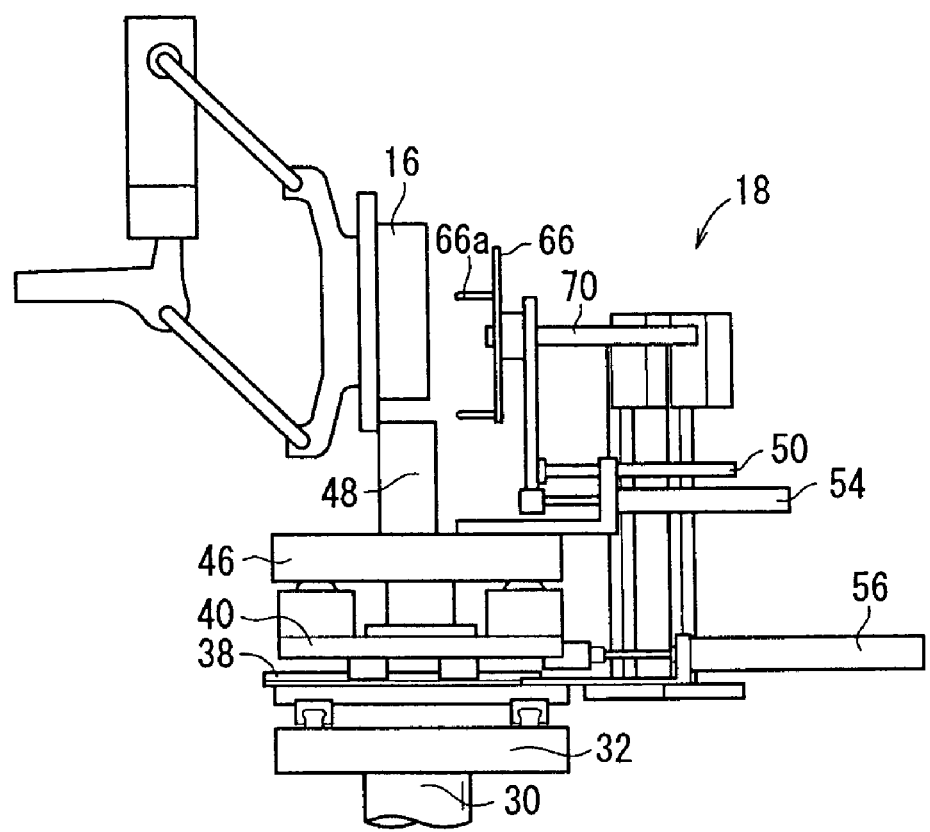
FIG. 9 is a view illustrative of a process of moving a horizontal movable plate to position a seating base below a hub.

In step S1 shown in FIG. 8, after the vehicle 14 is confirmed by a given means as being delivered to a measuring position of the toe angle measuring apparatus 10, the push rod 56 moves the horizontal movable plate 40 in the transverse direction of the vehicle to position the seating base 48 below the hub 16, as shown in FIG. 9.

After the seating base 48 is positioned, the push rod 56 is separated from the horizontal movable plate 40 by a predetermined releasing means to release the horizontal movable plate 40, which are now movable along the second rails 38.

Figure 6:
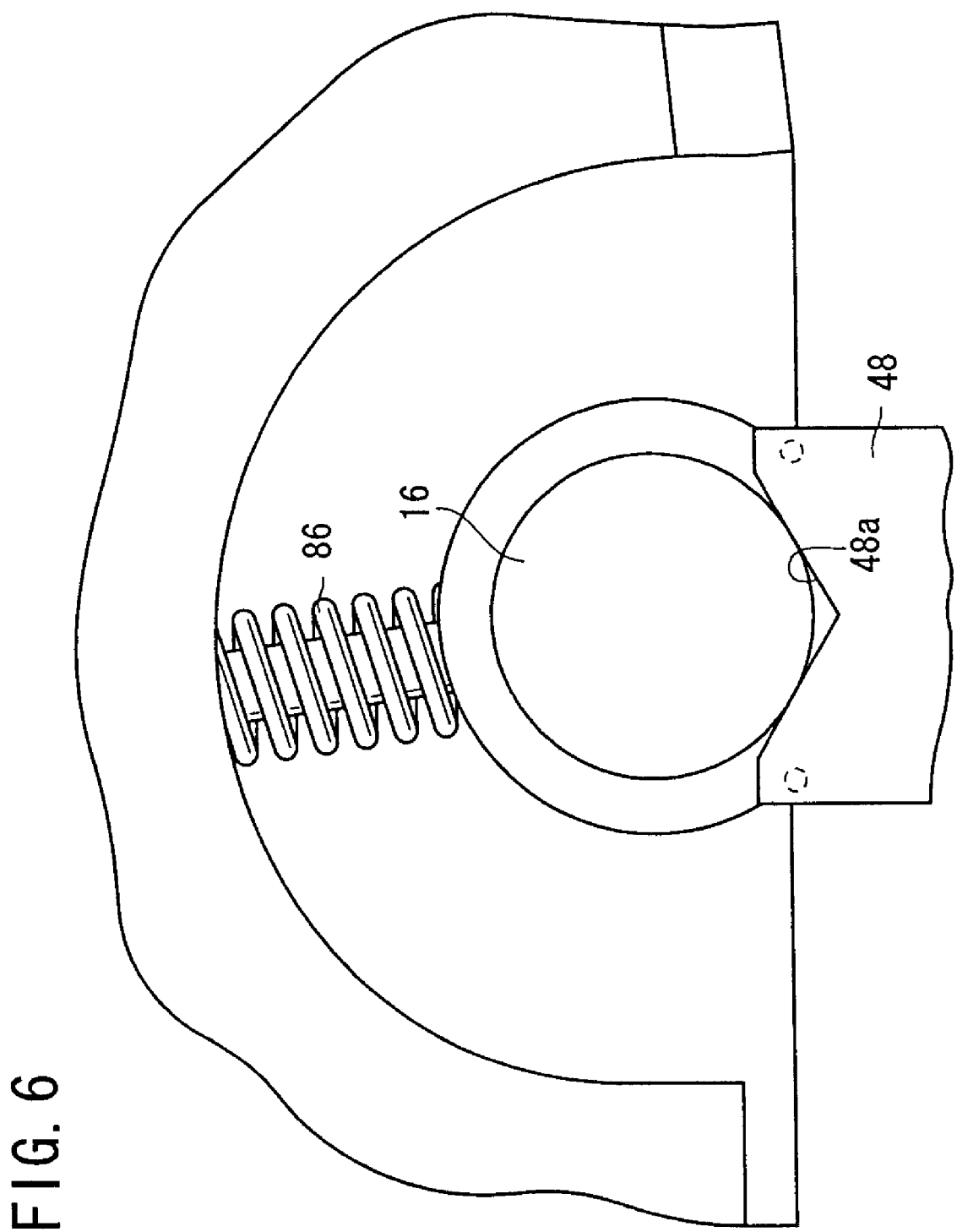
FIG. 6 is a side elevational view of a hub seated on a seating base.
Figure 10:
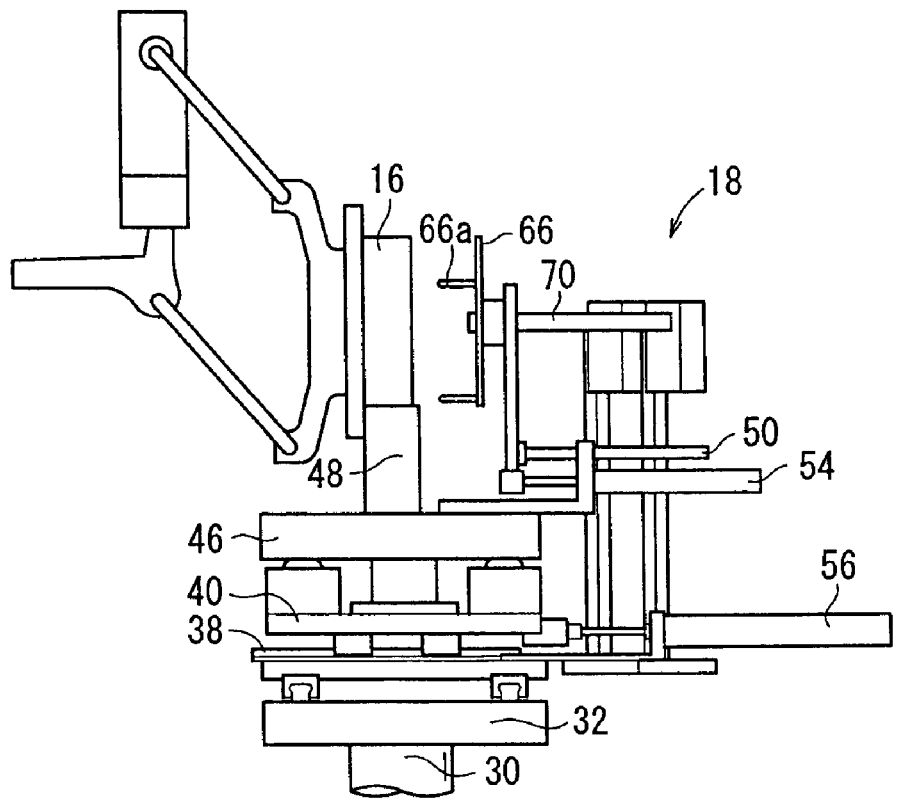
FIG. 10 is a view illustrative of a process of elevating a rod to seat the hub in a recess in the seating base.

In step S2, as shown in FIGS. 6 and 10, the rod of the main cylinder 30 is elevated to have the hub 16 seated in the recess 48a in the seating base 48. At this time, since the seating table 46 that is integral with the seating base 48 is floating, a centering action takes place to move the seating base 48 and the seating table 46 to face properly toward the lower surface of the hub 16.

The main cylinder 30 is pressure-controlled by a regulator to lift the hub 16 under given forces and hold the hub 16 while keeping a suspension 86 slightly compressed (see FIG. 5). When the vehicle 14 is delivered, it is suspended by the hanger 12 with no vehicle weight acting on the suspension 86, so that the vehicle 14 is not in an actual usage state. However, when suitable controlled forces are applied to the suspension 86 from below by the main cylinder 30, the vehicle 14 can be measured in a state close to the usage state.

The means for appropriately compressing the suspension 86 is not limited to the pressure control, but may be realized by height control. For height control, a stopper projecting from the first base member 32 may be provided and the height of the suspension 86 may be determined by bringing the stopper into abutment against a certain position on the lower surface of the vehicle 14.

Figure 11:
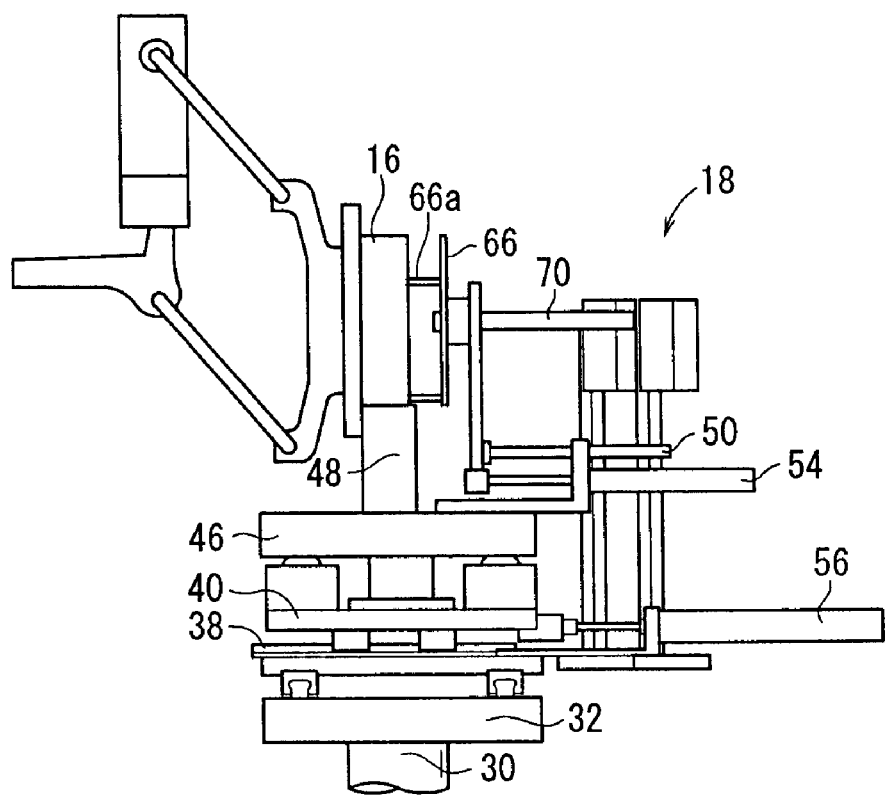
FIG. 11 is a view illustrative of a process of urging a measured member against a side face of the hub.

In step S3, as shown in FIG. 11, the auxiliary cylinder 54 is actuated to move the hub side face presser 52 along the slider 50 until the three feelers 66a of the hub presser disk 66 abut against the side face (see FIG. 6) of the hub 16. The hub 16 and the hub presser disk 66 are now spaced by the length of the feelers 66a and held accurately parallel to each other. It is thus possible to accurately measure the toe angle α of the hub 16 based on the position and attitude of the measured member 70 that is integral with the hub presser disk 66.

In step S4, the noncontact distance sensors 62a, 62b measure the respective distances $x_1$, $x_2$ up to the measurement surface 68 of the measured member 70, and supply the measured values to the controller 20.

In step S5, the controller 20 calculates a toe angle $α_0$ to be corrected of the hub 16 based on the obtained distances $x_1$, $x_2$. The toe angle $α_0$ to be corrected is a toe angle to be corrected by a corrective angle θ which represents a deviation in the thrust rotational direction. The toe angle $α_0$ to be corrected is calculated for each of the hubs 16 of the four wheels, independently.

Figure 12:
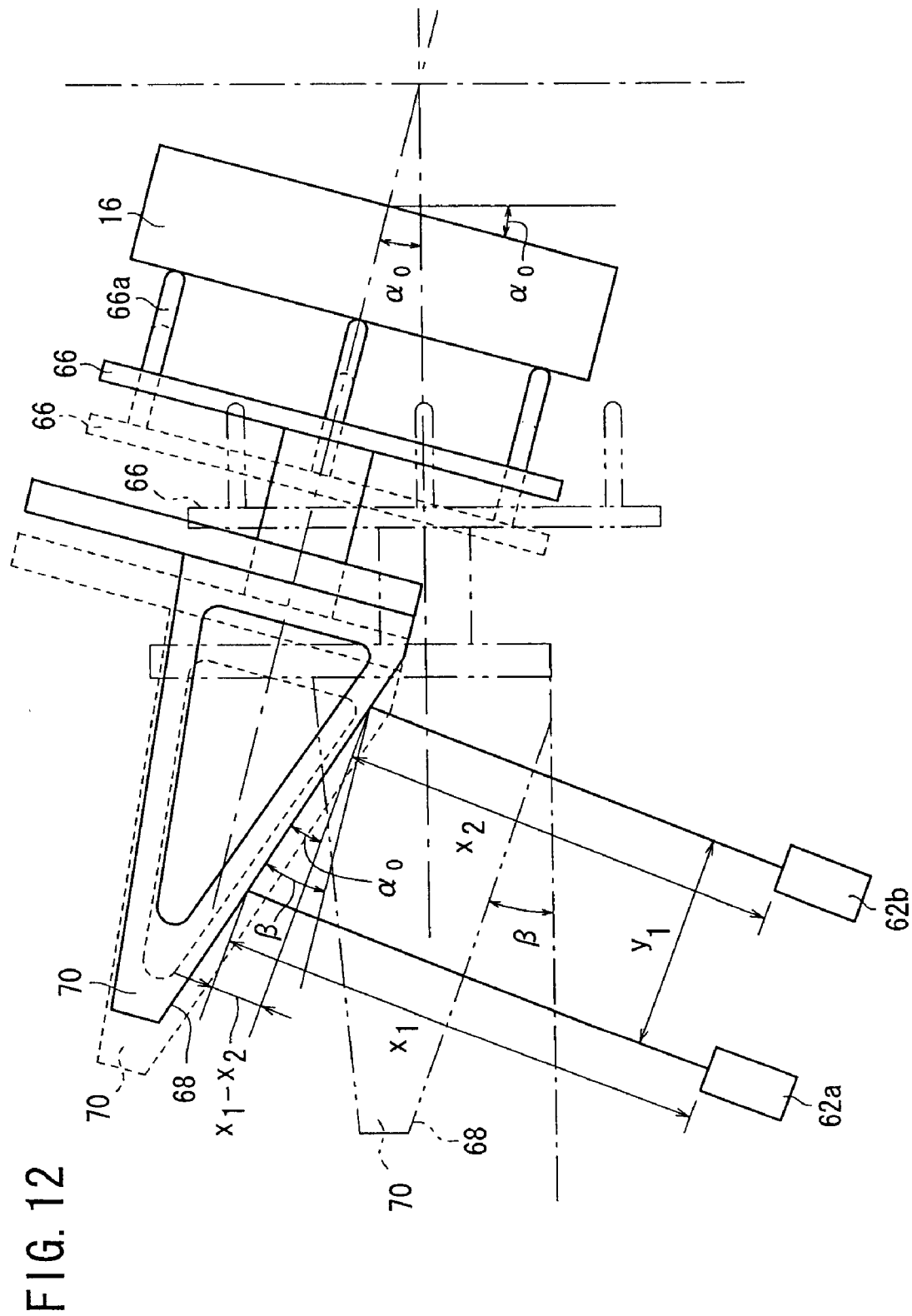
FIG. 12 is a view showing the relationship between a toe angle to be corrected and a distance measured by two noncontact distance sensors.

Specifically, as can be understood from FIG. 12, the toe angle $α_0$ to be corrected is calculated based on the difference $x_1 - x_2$ between the distances $x_1$, $x_2$ from the noncontact distance sensors 62a, 62b to the measurement surface 68 and the distance $y_1$ between the noncontact distance sensors 62a, 62b, according to the following equation (1):

$$α_0 = \mathrm{Tan}^{-1}\left(\frac{x_1 - x_2}{y_1}\right) \quad (1)$$

In FIG. 12, for an easier understanding of the movement of the measured member 70, the original position and the position where the hub 16 is seated on the seating base 48 in step S2 are indicated respectively by the two-dot-and-dash lines and the broken lines.

In step S6, the positions W of the respective hubs 16 of the four wheels in the transverse direction of the vehicle are determined. As can be understood from FIG. 13, the position W is calculated based on the average value of the distances $x_1$, $x_2$ from the noncontact distance sensors 62a, 62b to the measurement surface 68, according to the following equation (2):

$$W = W_0 + \Delta W = W_0 + \frac{\Delta x_1 + \Delta x_2}{2} \cdot \frac{1}{\sin \beta} \quad (2)$$

The ratio of a displacement $\Delta x$ of the distance $x_1$ and the distance x2 to a displacement $\Delta W$ of the position W is represented by sin β, and the large displacement $\Delta W$ of the hub 16 in the transverse direction of the vehicle is converted into the small displacement $\Delta x$ of the measurement surface 68 in the longitudinal direction of the vehicle 14. If the measurement surface tilt angle β is 5° and the displacement $\Delta W$ is 1, then the displacement $\Delta x$ of the distance $x_1$ and the distance $x_2$ is converted into 0.087 (=sin _5°) which is appropriate. Actually, if the measurement surface tilt angle β is 30° or smaller, then when the displacement $\Delta W$ is 1, the displacement $\Delta x$ of the distance $x_1$ and the distance $x_2$ is reduced to one half, i.e., 0.5 (=sin _30°) or less, which is appropriate. If the measurement surface tilt angle β is 10° or smaller, then the displacement $\Delta x$ is 0.174 (=sin _10°) or less, which is sufficiently small and more appropriate.

Further, the lower limit value of the measurement surface tilt angle β is set depending on the resolution performance of the noncontact distance sensors 62a, 62b and the expected displacement $\Delta x$, and may be 1° or more.

The measurement range used by the noncontact distance sensors 62a, 62b becomes sufficiently small, so that there will be no measurement failures due to measuring values beyond the measurement range. Not only the noncontact distance sensors 62a, 62b, but also general sensors tend to have lower measurement accuracy per unit length as the measurement range is wider. However, the toe angle measuring apparatus 10 has a sufficiently small measurement range required, and hence the noncontact distance sensors 62a, 62b may have a small range for measuring the distances $x_1$, $x_2$ highly accurately.

Figure 13:
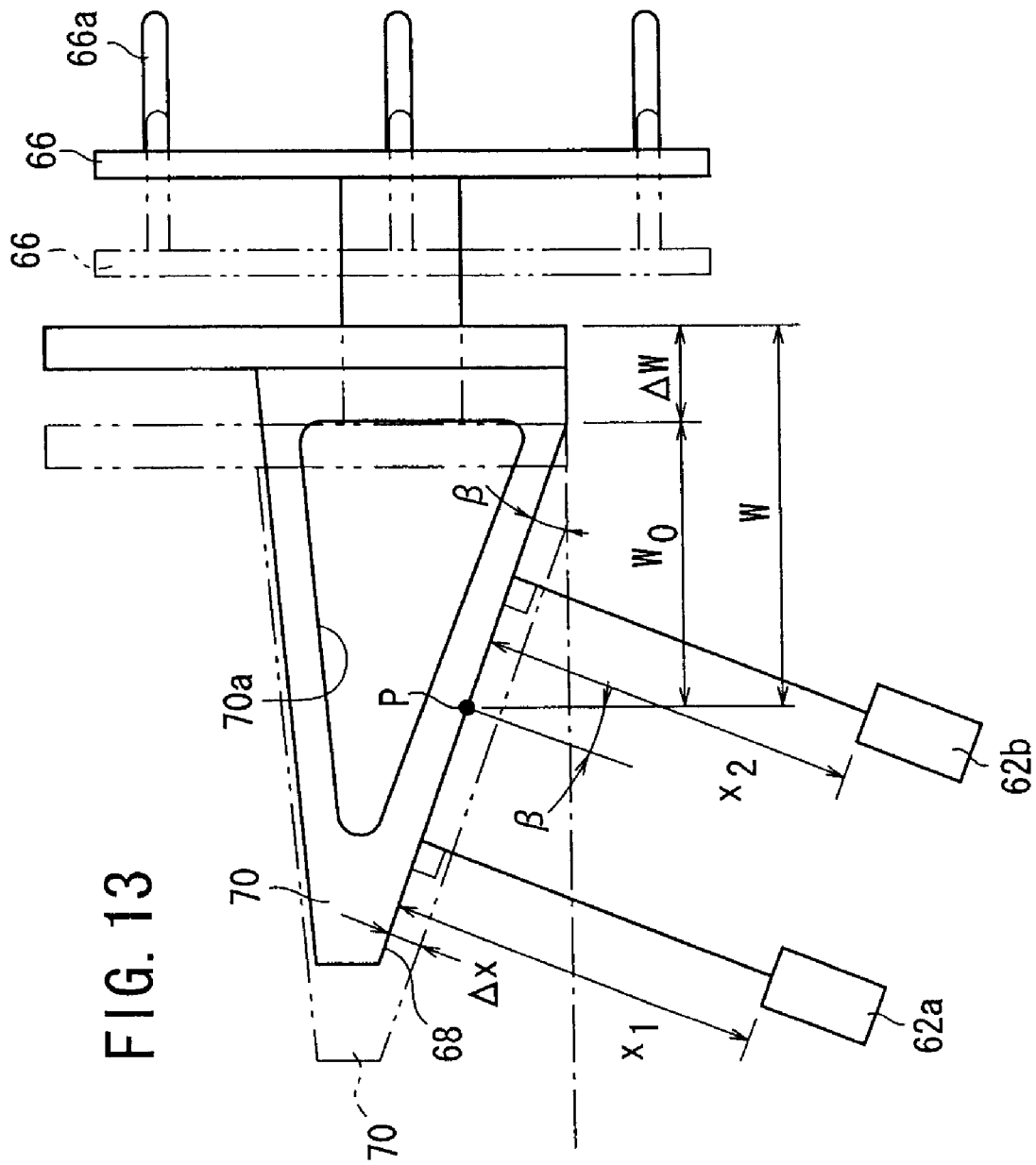
FIG. 13 is a view showing the relationship between the position of a hub in the transverse direction of the vehicle and a distance measured by two noncontact distance sensors.

As can be understood from FIG. 13 and the equation (2), a reference point P for calculating the position W is a point where W=$W_0$=$x_0$/sin β on the assumption that the distances $x_1$, $x_2$ at the time the measured member 70 is in the original position are expressed as $x_1$=$x_2$=$x_0$. Specifically, the reference point P is an intermediate point between the points where the distance $x_1$ and the distance $x_2$ are measured.

In FIG. 13, the toe angle $\alpha_0$ to be corrected is shown as $\alpha_0$=0 for an easier understanding. However, the equation (2) is also satisfied if $\alpha_0 \neq 0$.

In step S6, the positions W of the respective hubs 16 of the four wheels are calculated. In the description given below, these positions W are distinguished from each other such that the position of the right front wheel is represented by $W_{FR}$, the position of the right rear wheel by $W_{RR}$, the position of the left front wheel $W_{FL}$, and the position of the left rear wheel by $W_{RL}$.

Figure 14:
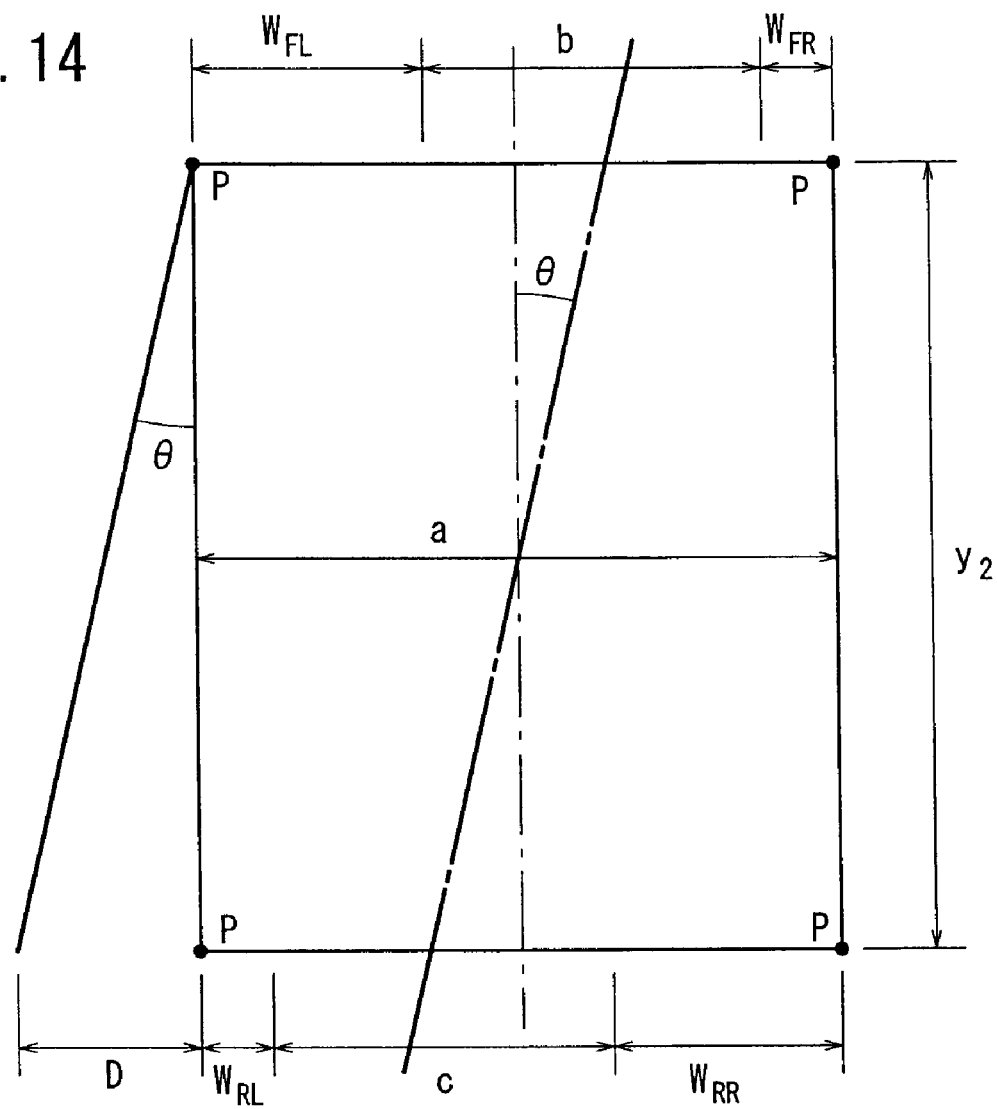
FIG. 14 is a diagram showing the relationship between the positions of hubs in the transverse direction of the vehicle and a corrective angle.

In step S7, a corrective angle θ (see FIG. 1) which represents a deviation in the thrust rotational direction is determined. In order to determine a corrective angle θ a corrective angle tangent value D shown in FIG. 14 is determined according to the following equation (3):

$$D = \left(W_{FL} + \frac{b}{2}\right) - \left(W_{RL} + \frac{c}{2}\right) \quad (3)$$

-continued
$$= \left(W_{FL} + \frac{a - (W_{FL} + W_{FR})}{2}\right) - \left(W_{RL} + \frac{a - (W_{RL} + W_{RR})}{2}\right)$$
$$= \frac{2W_{FL} + a - W_{FL} + W_{FR} + 2W_{RL} - a + W_{RL} + W_{RR}}{2}$$
$$= \frac{W_{FL} + W_{FR} + W_{RL} + W_{RR}}{2}$$
$$= \frac{-(W_{FR} + W_{FL}) + (W_{RR} + W_{RL})}{2}$$

where the parameter a represents the distance between the left and right reference points P, the parameter b the distance between the left and right front wheels, and the parameter c the distance between the left and right rear wheels. Using the determined corrective angle tangent value D, a corrective angle θ is determined as θ=$Tan^{-1}$ (D/$y_2$) where the parameter $Y_2$ represents the wheelbase of the vehicle 14. When the equations are rearranged, the corrective angle θ is calculated according to the following equation (4):

$$\theta = \tan^{-1}\left(\frac{-(W_{FR} + W_{RL}) + (W_{RR} + W_{FL})}{2y_2}\right) \quad (4)$$

In step S8, the toe angles $\alpha_0$ to be corrected of the respective hubs 16 of the four wheels are corrected by the corrective angle θ as α←$\alpha_0$–θ, thereby determining the toe angles α.

As described above, the suspension 86 is suitably compressed to measure the vehicle in a state close to the actual usage state. For calculating a toe angle α more accurately, the toe angle to be corrected may further be corrected by referring to predetermined toe curve data indicating the tendency of the toe angle α depending on the compressed amount of the suspension 86.

In step S9, a predetermined post-measurement process is performed. Specifically, the rod of the auxiliary cylinder 54 is retracted to displace the feelers 66a away from the hub 16, and the main cylinder 30 is operated to lower the hub side face presser 52. Thereafter, the vehicle 14 is delivered to a next process by the hanger 12. The determined toe angles α are displayed on the monitor 78 and recorded. If the determined toe angles α are of a value beyond a prescribed range, then information to that effect is sent to a managing computer, not shown.

As described above, with the toe angle measuring apparatus 10 and the measuring method according to the embodiment of the present invention, the measurement surface 68 of the measured member 70 extends outwardly from the hub 16 and is oriented at an acute angle to the transverse direction of the vehicle. Therefore, the displacement $\Delta W$ of the hub 16 in the transverse direction of the vehicle is converted into the small displacement $\Delta x$ of the measurement surface 68 in the longitudinal direction of the vehicle. Even if the installed position of the vehicle 14 is largely displaced from the standard position (even if the corrective angle θ is large or the corrective angle θ is nil or even if the vehicle is extremely displaced to the left or right), the position W of the hub 16 can be determined reliably and highly accurately, and the corrective angle θ and the toe angle α can be calculated highly accurately based on the position W. The noncontact distance sensors 62a, 62b that are spaced from each other by the distance $y_1$ measure the distances $x_1$, $x_2$ up to the measurement surface 68 for thereby determining the toe angle $\alpha_0$ to be corrected which serves as a basis for the toe angle α. The noncontact distance sensors 62a, 62b can thus be used to both detect the position W and detect the toe angle $\alpha_0$ to be corrected.

The hub side face presser 52 as it moves in the transverse direction acts as an urging means for urging the measured member 70 against the side face of the hub 16. Therefore, the hub 16 is seated on the seating table in a more appropriate attitude for the measurement of the toe angle $\alpha_0$ with higher accuracy. The measuring units 18 are provided in association with the respective wheels of the vehicle 14, and the corrective angle $\theta$ which is a rotational angle of the vehicle 14 as viewed in plan is determined based on the measured values from the noncontact distance sensors 62a, 62b of the measuring units 18. Since the toe angles $\alpha_0$ are corrected by the corrective angle $\theta$ thus determined, the toe angles $\alpha$ can be measured more accurately.

Figure 15:
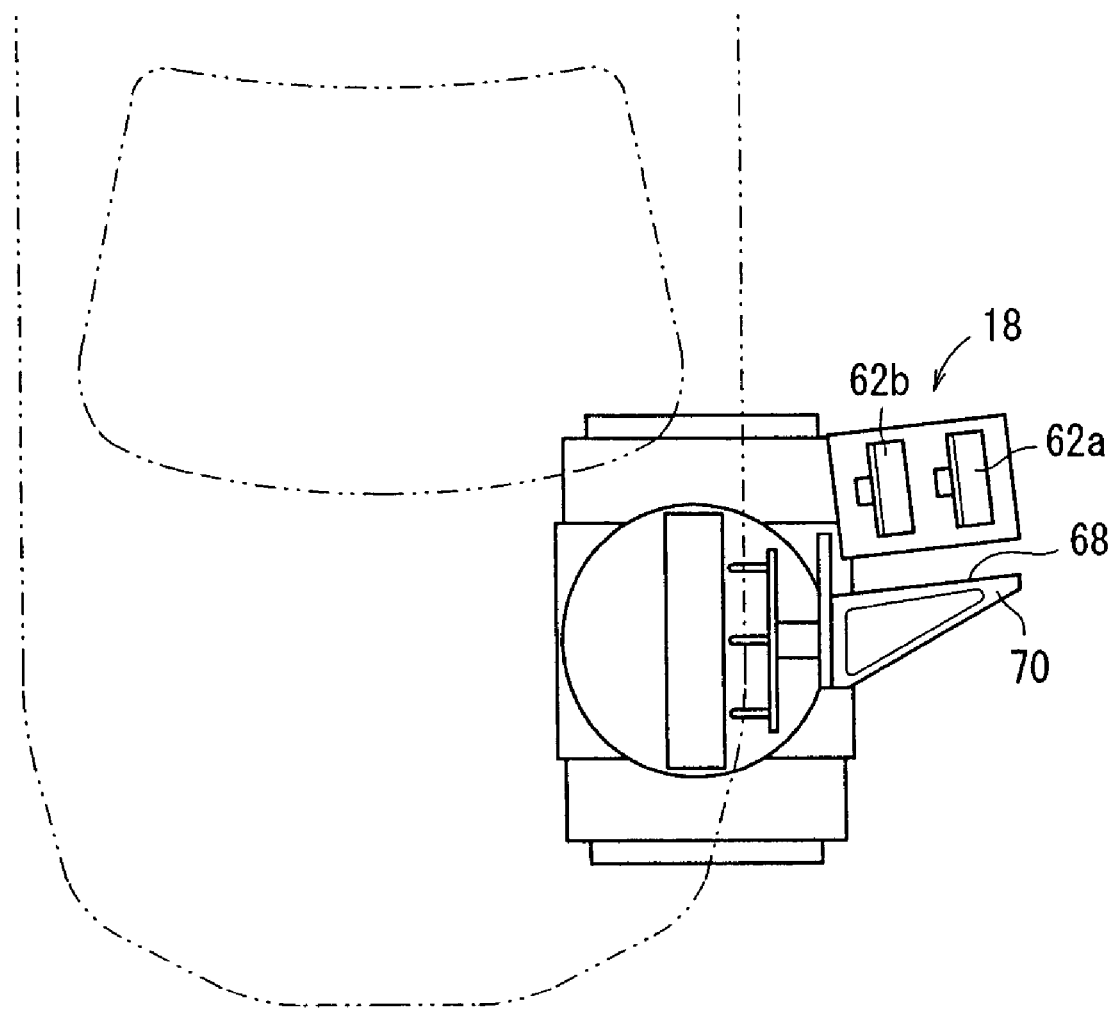
FIG. 15 is a plan view of a toe angle measuring apparatus according to a modification.

In the above embodiment, the measurement surface 68 is described as a surface slanted forwardly from the transverse direction of the vehicle. However, the measurement surface 68 is not limited to such a surface insofar as it is oriented at an acute angle to the transverse direction of the vehicle as viewed in plan. For example, as shown in FIG. 15, the measurement surface 68 may be a surface slanted rearwardly from the transverse direction of the vehicle. The object to be measured by the measuring unit 18 is not limited to the hub 16. The measuring unit 18 may measure a disk brake, a wheel, or a tire (wheel).

The invention claimed is:

1. A toe angle measuring apparatus including a measuring unit for measuring a toe angle of a wheel of a vehicle, wherein said measuring unit comprises:
    a seating table for seating said wheel or a mount for said wheel at a fixed position, said seating table being movable in at least a transverse direction of the vehicle or a rotational direction of said seating table as viewed in plan with respect to a predetermined base member;
    a measured member having a vertical measurement surface extending outwardly from said seating table;
    a pair of distance measuring means for measuring respective distances from two positions which are spaced from each other by a predetermined distance, to said measurement surface with respect to said base member; and
    toe angle calculating means for calculating said toe angle based on measured values from said distance measuring means;
    wherein said measurement surface of said measured member is oriented at an acute angle with respect to the transverse direction of the vehicle as viewed in plan at least when a measurement is made.

2. A toe angle measuring apparatus according to claim 1, wherein said acute angle is set to a value ranging from 1° to 10°.

3. A toe angle measuring apparatus according to claim 1, wherein said measuring unit is provided at each of four wheels of said vehicle, and said distance measuring means of the measuring units simultaneously measure the distances to the corresponding measurement surfaces.

4. A toe angle measuring apparatus according to claim 1, wherein said measuring unit includes a moving unit for moving said measured member into abutment against a side face of said wheel or a side face of the mount for said wheel.

5. A toe angle measuring apparatus according to claim 1, wherein the seating table includes a seating base having recess defined therein,
    wherein said recess is formed to receive the mount for said wheel.

6. A toe angle measuring apparatus according to claim 1, wherein the measurement surface of the measured member is oriented at an acute angle when the toe angle of the wheel is normal with respect to the transverse direction of the vehicle.

7. A toe angle measuring apparatus according to claim 1, wherein the pair of distance measuring means comprise first and second laser-type non-contact distance sensors.

8. A toe angle measuring apparatus according to claim 1, wherein the vehicle has four wheels or four wheel mounts,
    wherein said seating table, said measured member and said pair of distance measuring means are provided at each of the wheels or the wheel mounts,
    wherein said toe angle calculating means comprises:
        a plurality of to-be-corrected toe angle calculators each for determining a toe angle to be corrected of each of the wheels, based on a difference between the measured distances acquired by said pair of distance measuring means, said toe angle to be corrected being determined regardless of a tilt angle of the vehicle to a predetermined direction;
        an angle corrective value calculator for determining positions of said wheels or said wheel mounts in the transverse direction of the vehicle to calculate the tilt angle of the vehicle to the predetermined direction, based on an average value of the measured distances; and
        a corrector for determining toe angles of the wheels by subtracting the tilt angle calculated by the angle corrective value calculator from the toe angles to be corrected calculated by the plurality of to-be-corrected toe angle calculators, respectively.

9. A toe angle measuring method of measuring a toe angle of a wheel of a vehicle, comprising:
    a first step of seating said wheel or a mount for said wheel at a fixed position on a seating table which is movable in at least a transverse direction of the vehicle or a rotational direction of said seating table as viewed in plan with respect to a predetermined base member;
    a second step of urging a measured member having a vertical measurement surface extending outwardly from said seating table and oriented at an acute angle with respect to the transverse direction of the vehicle as viewed in plan at least when a measurement is made, against said wheel or said mount for said wheel;
    a third step of measuring respective distances from two positions which are spaced from each other by a predetermined distance, to said measurement surface with respect to said base member; and
    a fourth step of calculating said toe angle based on measured values from said third step.

10. A toe angle measuring method according to claim 9, wherein said acute angle is set to a value ranging from 1° to 10°.

11. A toe angle measuring method according to claim 9, wherein said measuring unit is provided at each of four wheels of said vehicle, and said distance measuring means of the measuring units simultaneously measure the distances to the corresponding measurement surfaces.

12. A toe angle measuring method according to claim 9, wherein said measuring unit includes a moving unit for moving said measured member into abutment against a side face of said wheel or a side face of the mount for said wheel.

13. A toe angle measuring method according to claim 9, wherein the first step of seating said wheel includes seating said wheel mount in a recess formed in a seating base provided in said seating table.

14. A toe angle measuring method according to claim 9, wherein the measurement surface of the measured member is oriented at an acute angle when the toe angle of the wheel is normal with respect to the transverse direction of the vehicle.

15. A toe angle measuring method according to claim 9, wherein the third step of measuring respective distances from two positions to said measurement surface is carried out using first and second laser-type non-contact distance sensors.

16. A toe angle measuring method according to claim 9, wherein the vehicle has four wheels or four wheel mounts,
   wherein said seating table and said measured member are provided at each of the wheels or the wheel mounts,
   wherein the fourth step of calculating said toe angle comprises:
      determining a toe angle to be corrected of each of the wheels, based on a difference between the measured distances acquired by said pair of distance measuring means, said toe angle to be corrected being determined regardless of a tilt angle of the vehicle to a predetermined direction;
      determining positions of said wheels or said wheel mounts in the transverse direction of the vehicle to calculate the tilt angle of the vehicle to the predetermined direction, based on an average value of the measured distances; and
      determining toe angles of the wheels by subtracting the tilt angle calculated by the angle corrective value calculator from the toe angles to be corrected calculated by the to-be-corrected toe angle calculators, respectively.

\* \* \* \* \*

UNITED STATES PATENT AND TRADEMARK OFFICE
CERTIFICATE OF CORRECTION

PATENT NO. : 7,661,198 B2  Page 1 of 1
APPLICATION NO. : 11/813639
DATED : February 16, 2010
INVENTOR(S) : Hara It is certified that error appears in the above-identified patent and that said Letters Patent is hereby corrected as shown below:

On the Face Page, in Field (56), under "U.S. PATENT DOCUMENTS", in Column 2, Line 7, delete "Hillman et al." and insert -- Voeller et al. --

Signed and Sealed this

Twenty-seventh Day of April, 2010

David J. Kappos
*Director of the United States Patent and Trademark Office*